United States Patent

[11] 3,628,613

[72] Inventor Edward J. Kaufman
North 81, R.R. 1, Newton, Kans. 67114
[21] Appl. No. 850,832
[22] Filed Aug. 18, 1969
[45] Patented Dec. 21, 1971

[54] AGRICULTURAL IMPLEMENT END FRAMES LIFT MEANS
11 Claims, 8 Drawing Figs.

[52] U.S. Cl. ................................................ 172/311,
172/456, 172/458, 280/412, 254/189, 74/108,
24/115
[51] Int. Cl. ........................................... A01b 65/02
[50] Field of Search .................................... 172/456,
451, 458, 311, 452, 310, 629, 4, 7–10; 254/189, 4,
47, 93; 187/17, 26; 24/123.7, 115.8; 74/102;
137/109, 110, 509, 599; 280/411, 412

[56] References Cited
UNITED STATES PATENTS

| | | | |
|---|---|---|---|
| 2,646,070 | 7/1953 | Holland | 137/109 |
| 2,777,375 | 1/1957 | Carlin et al. | 172/10 |
| 2,900,030 | 8/1959 | Edman | 172/9 |
| 3,123,146 | 3/1964 | Marindin | 172/9 |
| 3,255,830 | 6/1966 | Groenke | 172/456 |
| 172,896 | 2/1876 | Stebins | 187/26 |
| 913,109 | 2/1909 | Earling | 254/189 |
| 1,032,819 | 7/1912 | Driscoll | 187/17 |
| 1,271,976 | 7/1918 | Wood | 254/189 |
| 1,527,550 | 4/1924 | Hildebrand | 74/108 |
| 1,528,148 | 5/1925 | Giles | 74/108 |
| 1,810,680 | 6/1931 | Rothgard | 254/189 |
| 2,328,274 | 8/1943 | Hazen | 254/189 |
| 2,530,577 | 11/1950 | Gurries | 254/189 |
| 2,650,400 | 9/1953 | Kellems | 24/115.8 |
| 2,871,028 | 1/1959 | Hibbard | 172/311 |
| 1,970,617 | 8/1934 | Morgan | 24/123.7 |
| 3,033,296 | 5/1962 | Kaufman et al. | 172/311 |
| 3,354,966 | 11/1967 | Jackson | 172/311 |
| 3,362,483 | 1/1968 | Twidale | 172/456 |
| 3,470,965 | 10/1969 | Quickstad | 172/456 |

FOREIGN PATENTS

| | | | |
|---|---|---|---|
| 687,645 | 6/1954 | Canada | 172/456 |
| 89,202 | 6/1960 | Denmark | 24/115.8 |
| 1,197,262 | 7/1965 | Germany | 172/456 |

*Primary Examiner*—Robert E. Pulfrey
*Assistant Examiner*—C. W. Hanor
*Attorney*—Duane C. Bowen ABSTRACT: A hydraulic cylinder mounted on the central frame of an agricultural implement connects by sheave and pulley means to end frames to pivotally raise and lower the same.

INVENTOR.
EDWARD J. KAUFMAN

INVENTOR.
EDWARD J. KAUFMAN
BY
Duane C. Bowen
ATTORNEY

INVENTOR.
EDWARD J. KAUFMAN
BY Duane C. Bowen
ATTORNEY

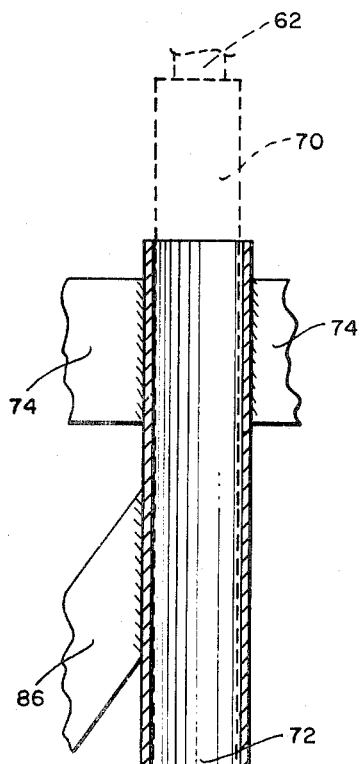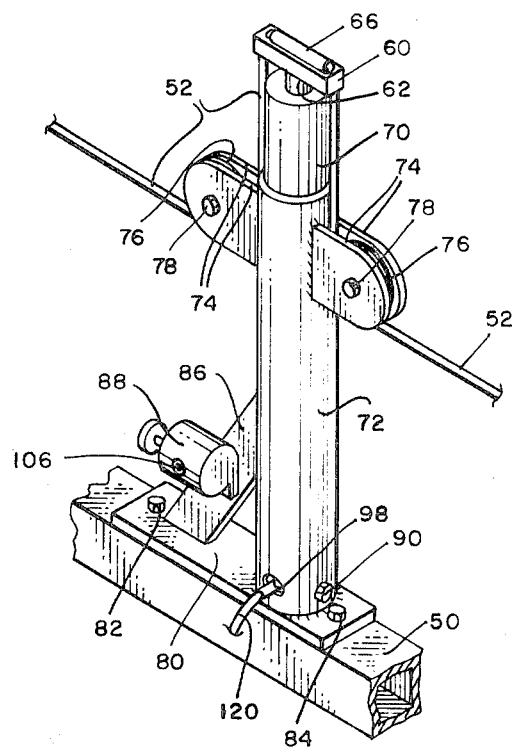

AGRICULTURAL IMPLEMENT END FRAMES LIFT MEANS

BRIEF SUMMARY OF THE INVENTION

My invention relates to raising and lowering end frames by an improved system including a hydraulic cylinder (in addition to the hydraulic cylinder for raising and lowering the agricultural implement as a whole) connected thereto by means including cable and sheave means.

BACKGROUND OF THE INVENTION AND OBJECTIVES

Pivotal end frames have become increasingly common on agricultural implements of certain types due particularly to increasing tractor horsepower in common use. The tractors can cover wider paths as they traverse fields but public roads (particularly with two-way traffic) cannot usually accommodate such wide implements, so it is a common expedient to fold up end frames during transportation especially on public roads. Even access lanes, roads, etc., within a farm may not readily accommodate such implements if end frames are not folded, i.e., at gate areas or in a lane which is narrowed by the nature of the terrain, by trees, by fencing or by a bordering crop which should not be disturbed.

Some implements provide no system for powering end frame folding. Sometimes this is done purely manually by lifting or lowering, but this is often not satisfactory because manual power may take too much time or the weights may be too great to handle safely or the weights may be too great to handle purely manually. Block and tackle means have been provided as a means to raise and lower end frames but have taken on undue amount of time to attach, operate and detach. Having a hydraulic piston and cylinder for each end frame is too costly. Using the hydraulic cylinder that powers overall implement raising and lowering involves too much time in detachment from primary function, attachment to a first end frame, operation, attachment to the second end frame, etc.

It is an object of my invention to provide a better solution to powering end frame raising and lowering than prior known systems. Further objectives include: to provide a system minimizing time of operation and also minimizing cost of equipment; to devise a system which can fit various implements and, in fact, even can be removed from one type of implement and installed on another; to provide a hydraulic system with proper sequential relationship to hydraulic general implement lift means; and to devise an end frame lift system which will not interfere with pivoting of end frames to accommodate land contours during implement usage.

My invention will be best understood together with further objectives and advantages of my invention from the following description, read with reference to the drawings, in which:

FIG. 6 is an enlarged view primarily in section of a receiving cylinder for a hydraulic cylinder which is indicated in dotted lines.

FIG. 7 is a perspective view of parts associated with the hydraulic cylinder, certain parts being shown in section.

FIG. 8 is an enlarged side view of the assembly at the head of the piston rod, certain parts being shown in section, a dotted line removed position of certain parts being shown to better reveal the structure, function and methods of assembly.

Figure 1:
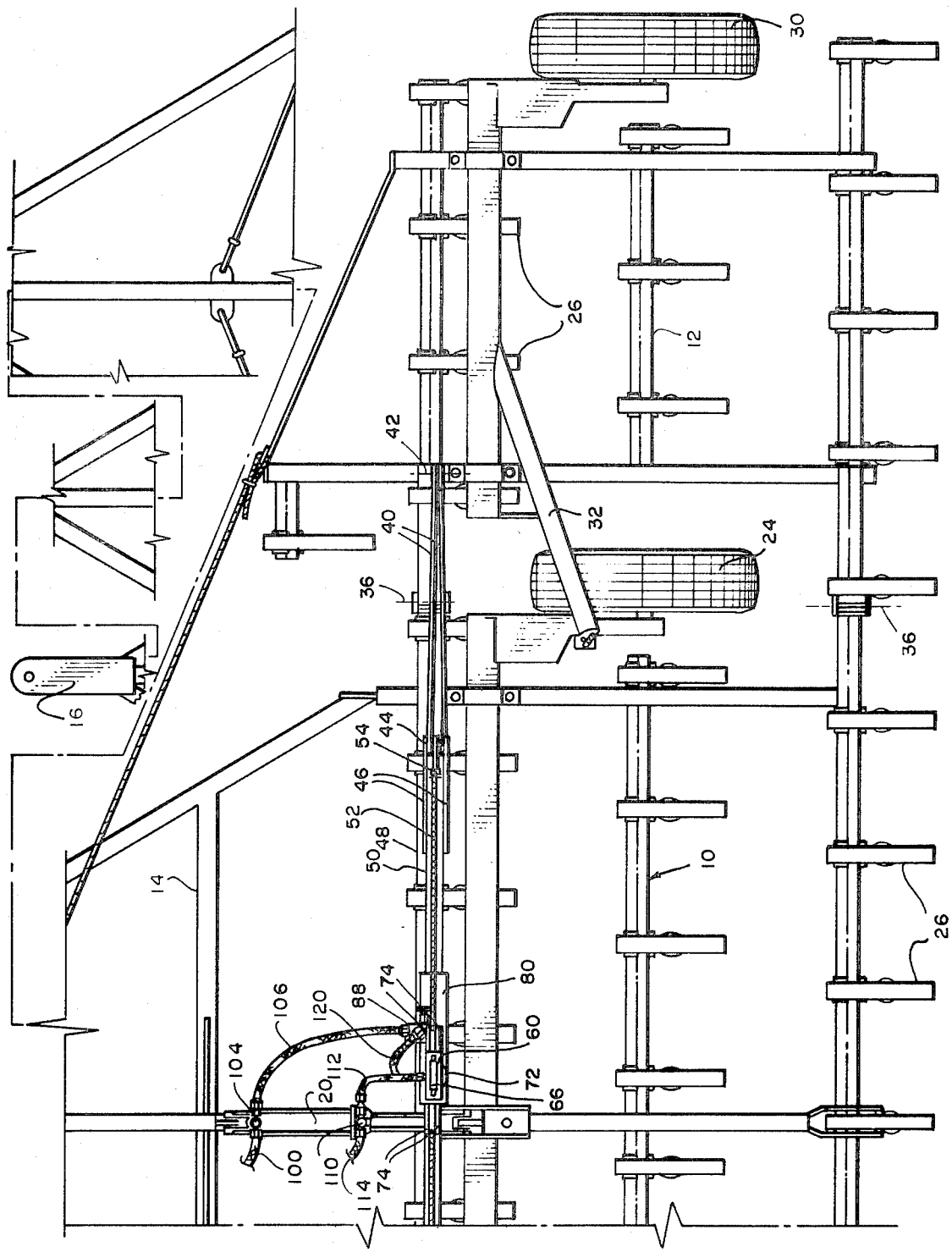
FIG. 1 is a plan view of somewhat in excess of half of a spring tooth harrow forming a specific embodiment of my invention. Certain portions are broken off and shown in removed positions to accommodate the large view in the size and shape of the drawing sheet.
Figure 2:
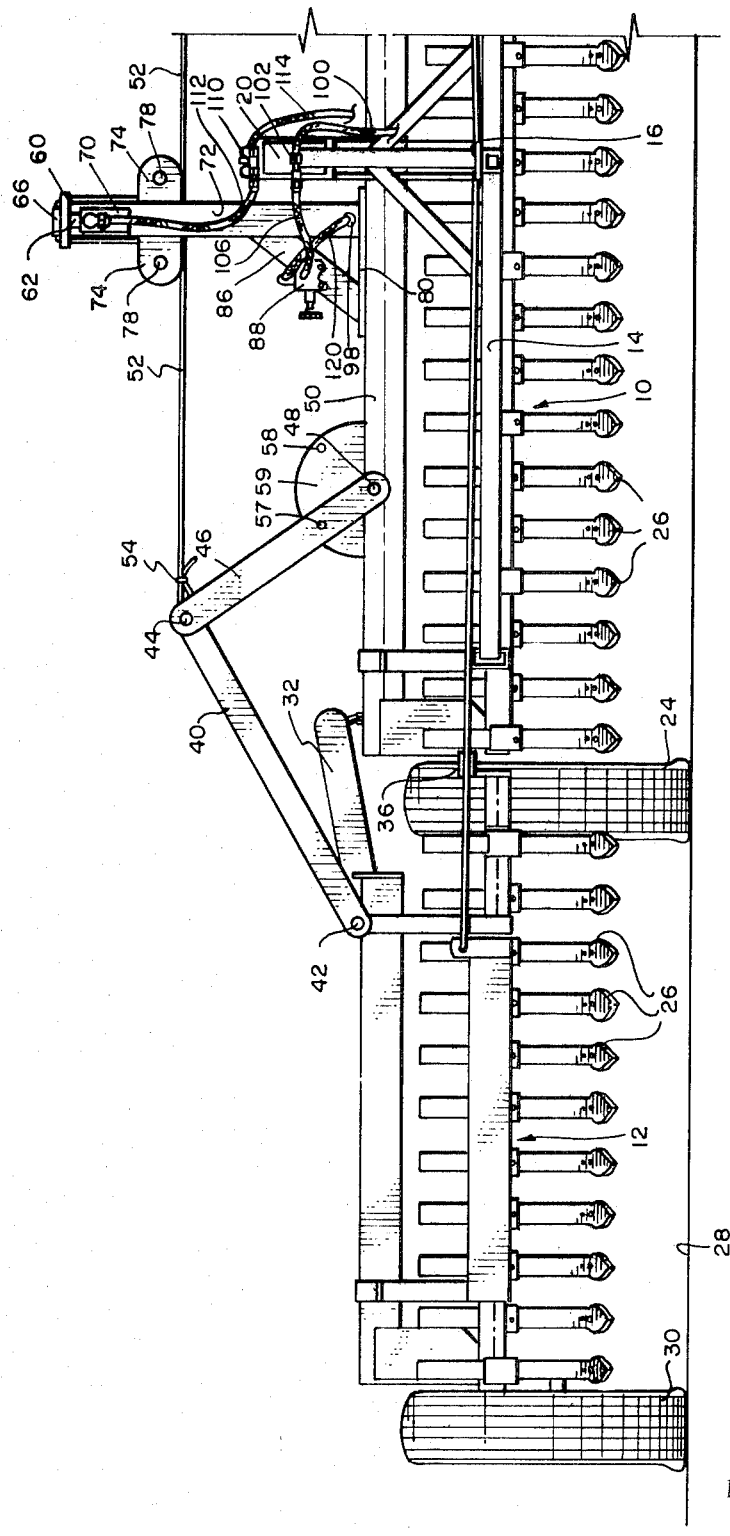
FIG. 2 is a front elevational view of the same portion of the harrow viewed in FIG. 1.
Figure 3:
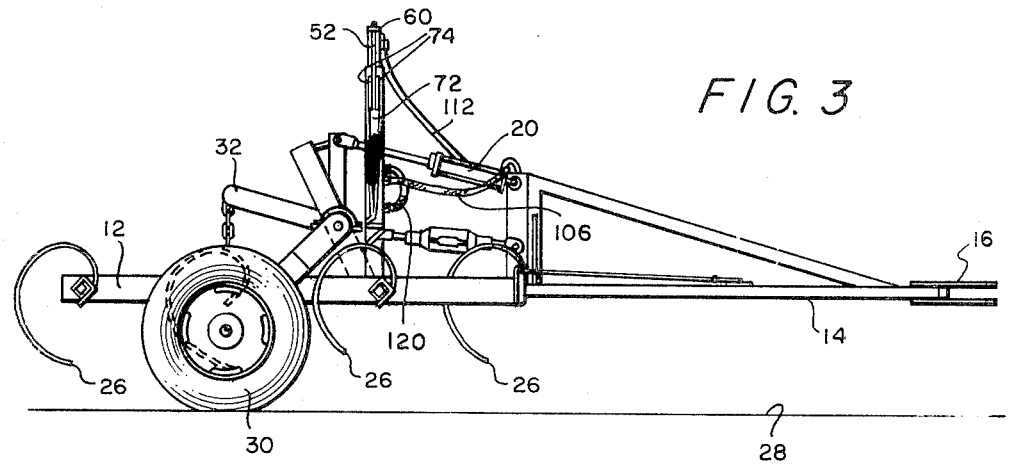
FIG. 3 is a side elevational view.
Figure 4:
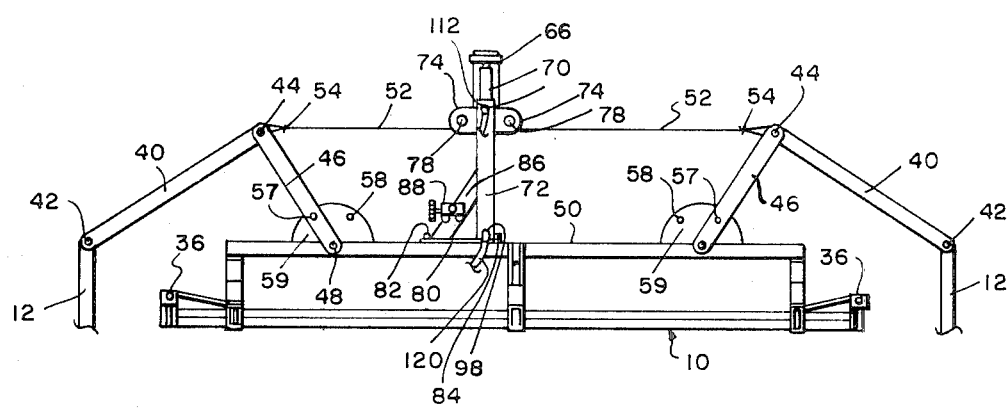
FIG. 4 is a front elevational view primarily of the portions of the harrow involved in lifting and lowering end frames.

Those working in the field of agricultural implement manufacture will understand the scope of application of my invention when I state that the invention has general application to types of implements having central frames and end frames hingedly connected thereto and pivotally raising and lowering. Such agricultural implements oftentimes having such end frames include harrows (spring tooth and spike tooth), chisels, V-plows or blades, discs and rotary hoes. The implement shown in the drawings, as an illustration of the invention, is a spring tooth harrow. I will not detail the construction of that harrow, as the implement details of construction are not generally important to understanding the present invention. The harrow largely resembles other spring tooth harrows commonly manufactured. A generally similar harrow was patented as U.S. Pat. No. 3,033,296, issued May 8, 1962, entitled "-Spring Tooth Harrow," Edward J. Kaufman and Jacob Kaufman inventors, and that patent will provide a more specific description of general details of spring tooth harrow construction for anyone wanting such information.

The spring tooth harrow has a central (or main) frame 10 and an end (or side or outboard) frame 12 at each side of central frame 10. In front of central frame 10 is a hitch frame section 14 having hitch means 16 to be connected to a tractor drawbar or the like. As explained in detail in U.S. Pat. No. 3,033,296 (and as partly similar to other implements), the structure is articulated so that upon operation of first hydraulic cylinder 20 by power from the tractor hydraulic power source 22, the cantilevered wheels 24 supporting central frame 10 act to generally raise and lower central frame 10 to disengage or engage spring teeth 26 with the ground 28 (and cantilevered wheels 30 of end frame 12 likewise act in unison with wheels 24 to raise and lower the spring teeth 26 attached thereto due to connecting means 32 to the articulated means of the central frame). End frames 12 upwardly fold toward a position superimposed to central frame 10 about hinge axes 36. The subject of my invention is the system for powering such upward folding, whereas all of the foregoing description is merely old background illustrating an implement having end frames pivoted to a central frame and the structure is old in the art in general and more specifically in U.S. Pat. No. 3,033,296, of which the implement shown herein is an improved version. In other words, as will be understood by those working in the art, my invention has general application to agricultural implements having central frames and having end frames hinged to the central frames for upward folding to reduce implement width especially when it is to be towed on public highways or at other places where its normal width in farming operations is objectionable.

Links 40 are pivotally connected at 42 to end frames 12 and are pivotally connected at their other ends to pins or spools 44 through the upper ends of a pair of bars forming levers 46 which are pivotally connected at their lower ends at 48 to a transverse bar 50. A cable 52 has its ends looped about pins 44, the end loops being secured by the usual cable clamps 54. It will be understood that end frames 12 can be raised by a pulling force on cable 52 and end frames 12 can be lowered by cable 52. End frames 12 can be secured in up position by bolt, pin or detent other means 57 engaging in opening 58 in semicircular plate 59, so that end frames 12 will not have to be held in up position by hydraulic pressure.

Cable 52 is centrally, adjustably secured to a crossmember 60 at the upper end of a piston rod 62 in the manner shown particularly in FIGS. 7 and 8 in which crossmember 60 has a pair of openings 64 parallel to rod 62 and cable 52 has a tube 66 thereon. Cable 52 is secured when it is tensed with tube 66 abutting crossmember 60 and with the cable abruptly bent to pass through openings 64. It will be understood that when cable 52 is loosened to the dotted line position shown in FIG. 8, tube 66 can be adjusted on cable 52, etc., to adjust the location of securing of cable 52 to piston rod 62.

A second hydraulic piston and cylinder assembly 70 powers piston rod 62. It will be understood from the drawings that end frames 12 are raised as piston rod 62 extends and end frames 12 would be lowered by retraction of piston rod 62. A tubular member 72 removably receives hydraulic cylinder 70 and has paired bracket arms 74 on either side supporting sheaves 76 rotatable about bolt or pin bearing means 78. Cable 52 is turned by sheaves 76 between piston rod 62 and levers 46. The use of tubular member 72 permits the purchase of a standard hydraulic cylinder 70 and avoids a need to disturb its structural integrity by welding or other operations on the cylinder, because sheave brackets and foot structure, etc., are welded to tube 72 rather than to cylinder 70. In fact, cylinder 70 could be removed for use on another implement, etc., but that is not necessary as tube 72 is removable if multiimplement usage were desirable, i.e., tube 72 is welded to a footplate 80 which is removably secured to member 50 by bolts 82, 84. A brace 86 between footplate 80 and tube 72 also serves as a mounting for valve 88. A bolt 90 extends through openings 92 in tube 72 through an opening (not shown) in hydraulic cylinder 70 to secure the cylinder in place, and is secured by a nut 94. Tube 72 has a lower opening 98 for access to cylinder 70 of a lower hydraulic line. The securing of hydraulic lines to cylinders 20 and 70 is actually by quick acting, collett-type hydraulic couplers or connectors, but these collett-type connectors are common articles of merchandise and are not detailed herein.

Figure 5:
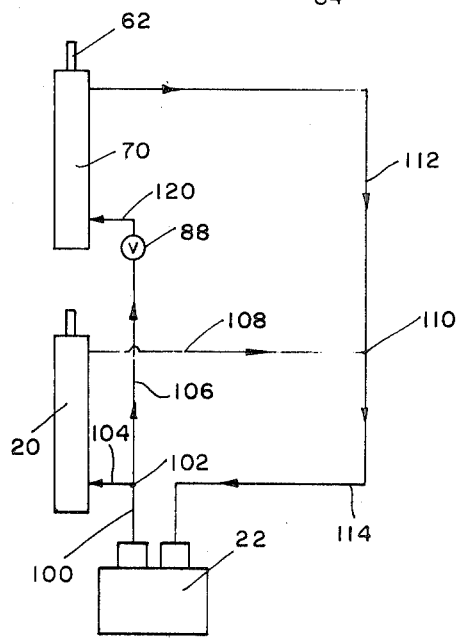
FIG. 5 is a diagram of hydraulic circuitry.

From the foregoing, the mechanical system of raising frames 12 will be understood, and it remains to describe the hydraulic supply and control circuitry. The FIG. 5 diagram has arrows applied to the direction of hydraulic fluid flow in the end frame lift made of operation. These arrows would reverse (and "in" and "out" ports on hydraulic fluid tractor source 22 would reverse) in lowering end frames 12. To trace hydraulic pressure during lift, fluid flow is from hydraulic source 22 through line 100 to T- or Y-fitting 102, with one branch 104 connecting to one end of cylinder 20 and the other branch connecting through line 106 to valve 88. Return flow from cylinder 20 is through line 108 connecting to a second T- or Y-fitting 110 (which also connects to the out port of cylinder 70 through line 112 and to the in port of hydraulic source 22 through line 114). Valve 88 is merely a type of on-off valve which is quick acting by means of a plunger but, of course, other on-off valves such as screw types could be substituted. Valve 88 is normally in closed or off position. In normal farming operations from time to time the operator will want to lift the implement, meaning in this case he will want to disengage spring teeth 26 from the ground, such as at the end of a row, the end of a field traverse, etc. The operator does not want end frames 12 to fold every time he lifts the ground engaging implement elements. Therefore, valve 88 will normally be closed, teeth 26 or other ground-engaging elements will be lifted on central and end frames, and end frames 12 will not fold.

However, when the operator wants to fold end frames 12, he will open valve 88 whereby hydraulic pressure will apply to second cylinders 70 via line 120 and piston rod 62 will be extended to lift end frames 12 via cable 52. Reverse hydraulic flow will result in application of hydraulic pressure to cylinders 70 and 20 via lines 112 and 108 respectively, thereby lowering end frames 12 and lowering the implement in general.

When I use the expression "cable" in the specification and claims, I am using the word as a convenient way of describing various equivalent flexible tension members, such as ropes, wires and chains. Although a cable is the preferred flexible tension member, when I use the expression cable I want to cover all equivalent applicable tension members. One reason to use a flexible tension member, rather than rigid linkage, is so that the end frames are free to ride up responsive to changes in terrain, whereas a truly rigid linkage would not permit such end frame action.

Having thus described my invention I do not wish to be understood as limiting myself to the precise details of construction shown but instead I wish to cover those modifications thereof which will be understood by those skilled in the art upon learning of my disclosure and which properly fall within my invention.

I claim:

1. In combination with an agricultural implement having a central frame and a first oil hydraulic piston and cylinder operative to hydraulically lift said central frame, and having a pair of end frames pivotally connected to said central frame to pivot relative to said central frame, means for raising and lowering said end frames, comprising:
   a. flexible tension member means connected to said end frames in a manner whereby said end frames can be pivoted and raised relative to said central frame by a pulling force from said flexible tension member means,
   b. a second oil hydraulic piston and cylinder mounted on said implement and connected to said flexible tension member means and operative thereby to raise and lower said end frames relative to said central frame upon extension and retraction of said second piston,
   c. a source of oil hydraulic fluid under pressure, first and second fluid connecting means between said source and said hydraulic cylinders on first and second sides respectively of said hydraulic pistons, said first sides of said pistons being the sides operative when pressurized to lift said central frame and to raise said end frames relative to said central frame, and valve means in said first fluid connecting means operative by implement operator operation upon his election to block application of hydraulic pressure from said source to said first side of said second hydraulic piston whereby said central frame can be lifted when desired without raising said end frames relative to said central frame, and
   d. said second cylinder being disposed upright and having an upwardly directed piston rod, said second cylinder being generally cylindrical in shape and an upright tube with an open upper end removable receiving said second cylinder and closely fitting the same whereby said tube serves the function of a housing and is not itself a hydraulic cylinder.

2. The subject matter of claim 1 in which said tube has a pair of brackets secured to opposite sides of the upper portion of said tube and a sheave at each side of said tube supported by said brackets, and said flexible tension member means being cable means attached to the upper end of said piston rod and having each end reeved through one of said sheaves and attaching to one of said end frames, whereby sheave support at said second cylinder is provided without direct connection to said second cylinder.

3. The subject matter of claim 2 in which there is a foot member secured to the bottom of said tube and bolt means removably securing said foot member to said central frame whereby said tube, brackets, sheaves, and second piston and cylinder can be removed from said implement and used on another implement.

4. The subject matter of claim 2 in which said cable means is a single unitary cable, said piston rod having a crossmember on its end, said crossmember having an opening at each end parallel to said rod through which said cable extends, whereby said cable is secured to said rod when it is tensed due to bends through said openings.

5. In combination with an agricultural implement having a central frame and having a pair of end frames pivotally connected to said central frame to pivot relative to said central frame, means for raising and lowering said end frames, comprising:
   a. a standard oil hydraulic piston and cylinder, said cylinder being generally cylindrical in shape, a tube mounted on said implement and receiving said cylinder and closely fitting the same whereby said tube serves the function of a housing for said cylinder and is not itself a hydraulic cylinder
   b. a pair of brackets secured to opposite sides of said tube and a sheave at each side of said tube supported by said brackets, said piston having a piston rod and cable means secured to the end of said piston rod and having an end reeved through each sheave and connected to each end frame in a manner so as to raise said end frames when a pulling force is applied to said cable means by movement of said piston rod when hydraulic pressure is applied to said cylinder, whereby sheave support at said cylinder for cable connection to end frames is provided without attachment of said sheaves directly to said cylinder.

6. The subject matter of claim 5 in which said hydraulic cylinder and said tube have aligned openings in their lower end portions and bolt means extending through said openings releasably securing said cylinder in said tube.

7. The subject matter of claim 5 in which said cable means is a single unitary cable, said piston rod having a crossmember on its end, said crossmember having an opening at each end parallel to said rod through which said cable extends whereby said cable is secured to said rod when it is tensed due to bends through said openings.

8. The subject matter of claim 7 in which there is a tubular member on said cable between said openings whereby said tubular member limits bending of said cable thereby making slipping of said cable relative to said openings more difficult.

9. The subject matter of claim 5 in which said cylinder and said tube are upright, said tube having a foot member secured to the bottom of said tube and bolt means removably securing said foot member to said central frame whereby said tube, piston and cylinder, brackets and sheaves can be removed from said implement and used on another implement.

10. The subject matter of claim 5 in which there is a pivotal lever located between said piston and cylinder and each end frame, connecting means between each lever and the associated end frame, said cable means being connected to said end frames by being connected to said levers, and a second oil hydraulic piston and cylinder connected to said central frame operative to hydraulically lift said central frame whereby raising of said end frames relative to said central frame is powered by a different piston and cylinder than the piston and cylinder used for power lifting of said central frame.

11. In combination with an agricultural implement having a central frame and having a pair of end frames pivotally connected to said central frame to pivot relative to said central frame, means for raising and lowering said end frames, comprising:

a. an upright oil hydraulic piston and cylinder, said cylinder being generally cylindrical in shape, an upright tube removably receiving said cylinder and closely fitting the same whereby said tube serves the function of a housing for said cylinder and is not itself a hydraulic cylinder, said tube having a foot member secured to the bottom of said tube and bolt means removably securing said foot member to said central frame whereby said tube and piston and cylinder can be removed from said implement and used on another implement b. said piston having a piston rod and flexible tension member means connected to said piston rod and having an end connected to each end frame in a manner operative to raise said end frames upon movement of said piston rod when hydraulic pressure is applied to said cylinder.

* * * * *